US009884402B2

(12) United States Patent
Skuratov et al.

(10) Patent No.: US 9,884,402 B2
(45) Date of Patent: Feb. 6, 2018

(54) DEVICE FOR DIAMOND-BURNISHING OF HOLES

(71) Applicant: Samara State Aerospace University, Samara (RU)

(72) Inventors: Dmitrii Leonidovich Skuratov, Samara (RU); Aleksei Nicolaevich Shvetcov, Samara (RU)

(73) Assignee: SAMARA STATE AEROSPACE UNIVERSITY, Samara (RU)

( * ) Notice: Subject to any disclaimer, the term of this patent is extended or adjusted under 35 U.S.C. 154(b) by 393 days.

(21) Appl. No.: 14/570,824

(22) Filed: Dec. 15, 2014

(65) Prior Publication Data
US 2016/0167194 A1 Jun. 16, 2016

(30) Foreign Application Priority Data

Jan. 28, 2014 (RU) .................. 201402800

(51) Int. Cl.
*B24B 39/02* (2006.01)
*B23P 9/02* (2006.01)

(52) U.S. Cl.
CPC .............. *B24B 39/02* (2013.01); *B23P 9/025* (2013.01); *Y10T 29/47* (2015.01)

(58) Field of Classification Search
CPC ................ B23D 2277/14; B23P 9/025; B24B 39/02–39/026; B24B 39/00; B24B 39/003; B24B 39/04–39/06; Y10T 29/47; Y10T 29/477

See application file for complete search history.

(56) References Cited

PUBLICATIONS

English Translation of: S.R. Abulkhanov. Surface roughness examination of small diameter holes in 12Cr18Ni9Ti steel pieces after treatment by diamond-burnishing, and S.R. Abulkhanov. Highly efficient methods and tools for mechanical machining of materials. Kuibyshev Aviation Institute.—Kuibyshev, 1984. Translation generated Nov. 2016.*
S.R. Abulkhanov. Surface roughness examination of small diameter holes in 12Cr18Ni9Ti steel pieces after treatment by diamond-burnishing, and S.R. Abulkhanov Highly efficient methods and tools for mechanical machining of materials. Kuibyshev Aviation Institute.—Kuibyshev, 1984.

* cited by examiner

*Primary Examiner* — Christopher Besler
*Assistant Examiner* — Matthew P Travers
(74) *Attorney, Agent, or Firm* — Matthew A. Pequignot; Pequignot + Myers LLC

(57) ABSTRACT

Various kinds of finishing and hardening treatments of holes by methods of plastic surface deformation can find application in many branches of engineering industry. In particular for burnishing holes on a milling or drilling machine tool. A device for diamond-burnishing of holes increases the functional possibilities, improves the quality of the treated hole surface and the endurance of the burnishing tool, provides the opportunity for a precise regulation in order to get the necessary hole caliber, and uses the load of all the weights for obtaining the necessary pressing force. The device structure comprises a housing with a tapered stem, central and terminal arms with crossheads and shafts, bars with weights, a foot with a cylindrical body, and an arbor with a diamond-burnishing tool.

9 Claims, 3 Drawing Sheets

DEVICE FOR DIAMOND-BURNISHING OF HOLES

CROSS-REFERENCE TO RELATED APPLICATIONS

The present invention claims priority from Russian Patent Application No. 2014102800 filed Jan. 28, 2014, which is incorporated herein by reference.

TECHNICAL FIELD

The present invention relates to various kinds of finishing and hardening treatment of holes in pieces and can find application in many branches of engineering industry.

BACKGROUND OF THE INVENTION

It is known a device for diamond-burnishing of small diameter holes, comprising a stem, a runner, some bars, an inertial bob, a rod with a diamond indenter, a counterweight (see the paper by S. R. Abulkhanov. Surface roughness examination of small diameter holes in 12Cr18Ni9Ti steel pieces after treatment by diamond-burnishing, and S. R. Abulkhanov. Highly efficient methods and tools for mechanical machining of materials. Kuibyshev Aviation Institute.—Kuibyshev, 1984. P. 83-88).

A drawback of the above disclosed structure of the device resides in inadequate quality of the treated surface, in the impossibility to use standard diamond-burnishing tools, in the impossibility to provide precise adjustment of the treated hole caliber, when the pressing force is provided by one inertial weight without participation of a counterweight. This device is taken as the closest prior art.

An object of the present invention is to enlarge the functional possibilities of the device design, to improve the quality of the treated hole surface, and the endurance of the burnishing tool.

SUMMARY OF THE INVENTION

Accordingly the present invention relates to a device for diamond-burnishing of holes, comprising a housing; a stem extending from the housing; and a translation mechanism mounted on the stem in the housing.

The translation mechanism comprises: a pair of central arms and two pairs of terminal arms fitted on an end of the stem, crossheads linking the central and terminal arms to each other, guide pins receiving the crossheads for sliding thereon, a compression spring mounted between said crossheads, extension springs linking ends of said guiding pins to each other, bars linked to ends of said terminal arms via shafts, and inertial weights mounted on said bars.

A cover is mounted in a groove in the housing, and linked to the translation mechanism via one of said shafts. A foot is mounted on the cover, and cylindrical body is mounted on the foot. An arbor is mounted in an opening in the cylindrical body; and a diamond-burnishing tool is fixed to said arbor.

BRIEF DESCRIPTION OF THE DRAWINGS

The invention will be described in greater detail with reference to the accompanying drawings which represent preferred embodiments thereof, wherein.

DETAILED DESCRIPTION

While the present teachings are described in conjunction with various embodiments and examples, it is not intended that the present teachings be limited to such embodiments. On the contrary, the present teachings encompass various alternatives and equivalents, as will be appreciated by those of skill in the art.

Figure 1:
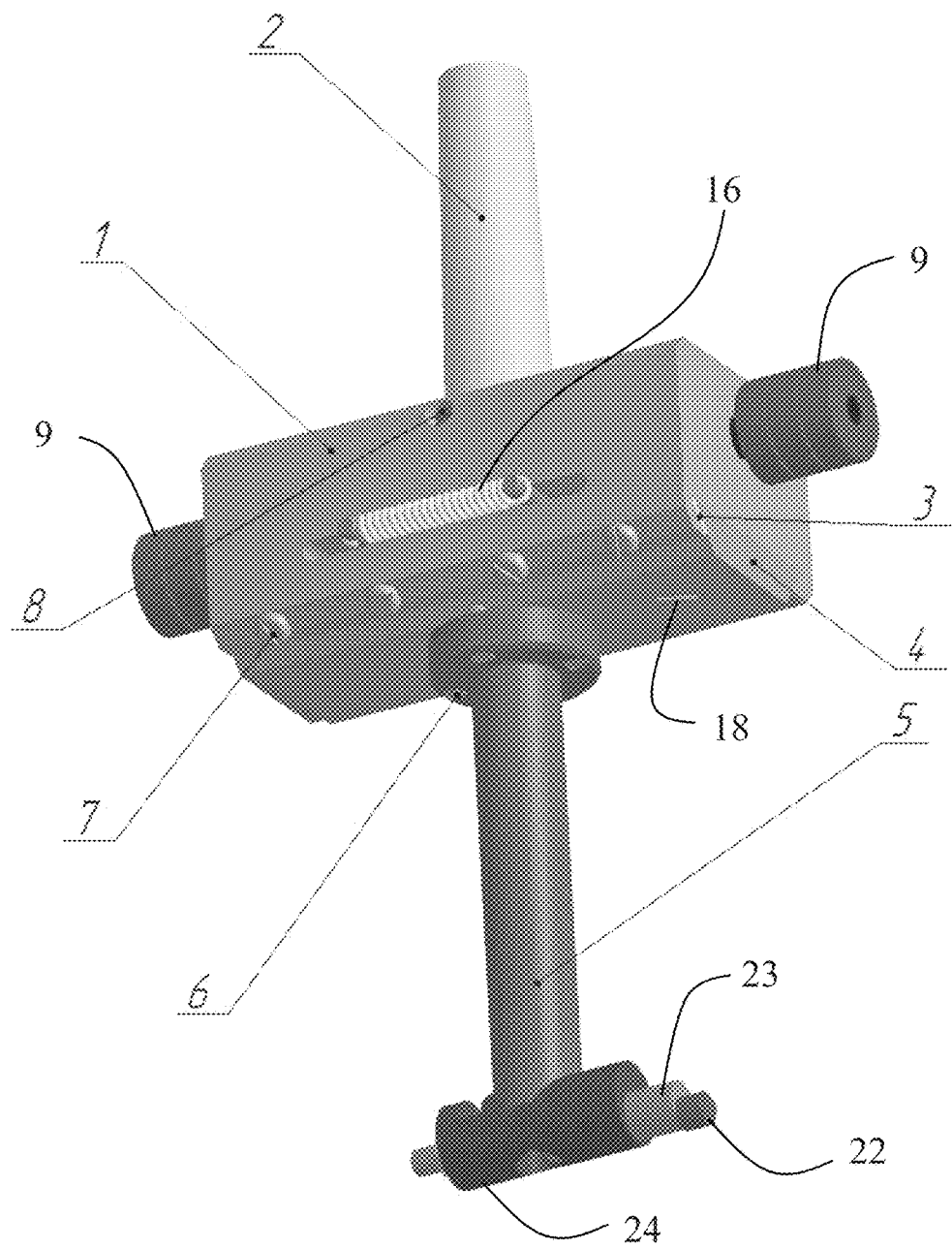
FIG. 1 shows the general view of the device.
Figure 2:
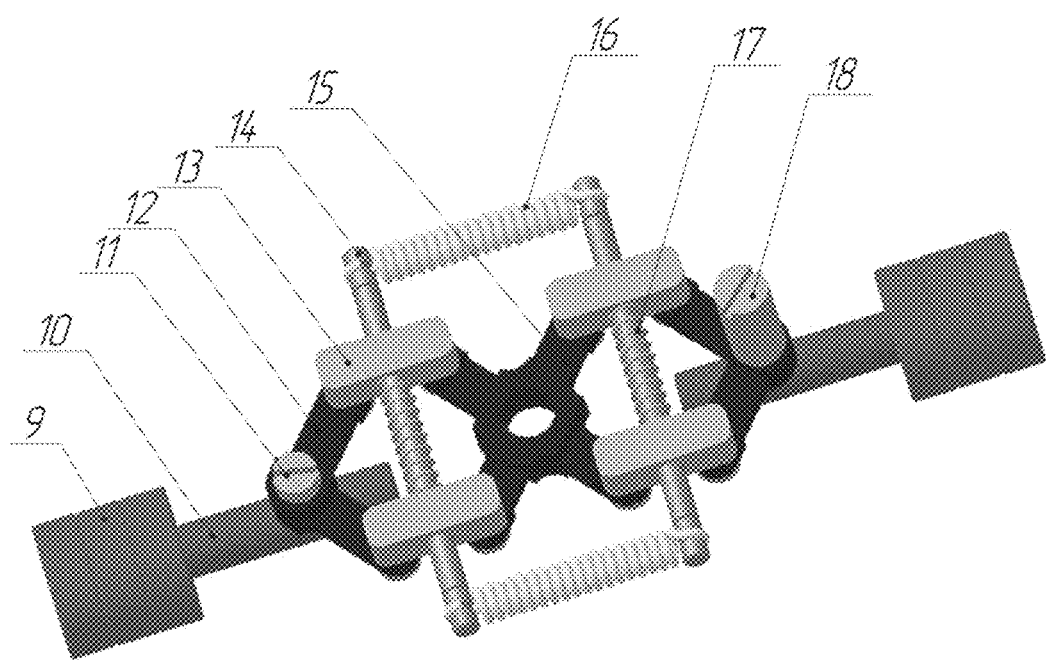
FIG. 2 shows the arms-crosshead mechanism.
Figure 3:
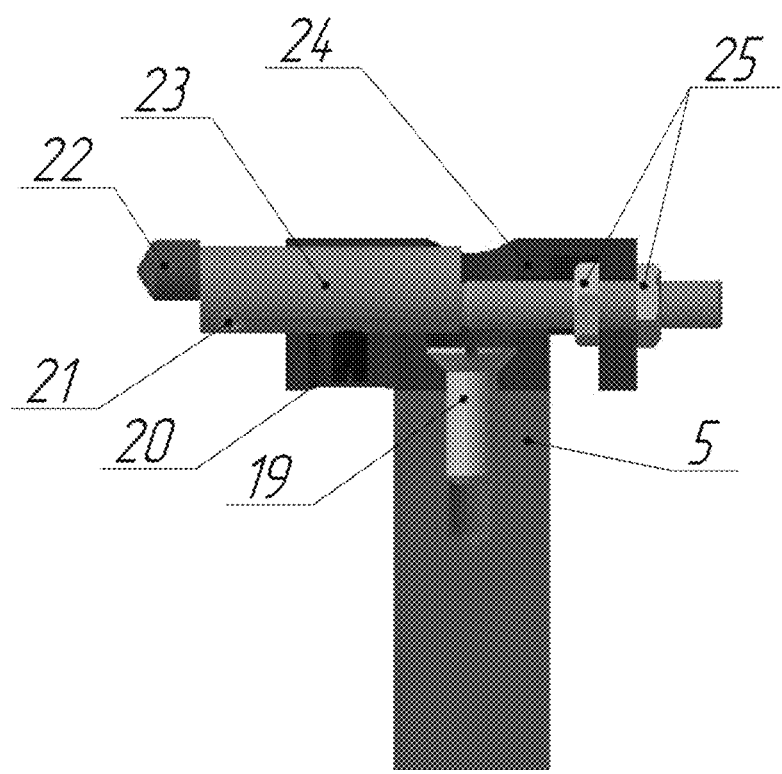
FIG. 3 shows the construction elements of the foot of the device.

FIG. 1 shows the general view of an embodiment of a device for diamond-burnishing of holes, comprising a housing 1, a stem 2, preferably tapered, a brass plate 3, and a cover 4. The brass plate is mounted in a groove between the housing 1 and the cover 4 at one side using brass plate mounting screws 7. Preferably, the cover is mounted in a dovetail groove in the housing 1. A foot 5 with an arbor 23 and a diamond-burnishing tool 22, is mounted on the cover 4, preferably using foot mounting screws 6. A set screw 8 connects the stem 2 to the housing 1. FIG. 2 shows an arms-crosshead translation mechanism comprising weights 9 mounted on bars 10 via shafts 11 and 18. A pair of central arms 15 and two pairs of terminal arms 12 are fitted on the end of the stem 2. Crossheads 13 link the central arms 15 and the terminal arms 12 together. The crossheads 13 slide along guide pins 14, which are linked together with extension springs 16. The guide pins 14 are located in grooves provided in the housing 1. Compression springs 17 are mounted between crossheads 13. FIG. 3 shows foot elements of the device, comprising a diamond-burnishing tool 22, an arbor 23 for mounting said diamond-burnishing tool, and a cylindrical body 24, including nuts 25 for securing the arbor 23 within the cylindrical body 24. Preferably, the diamond-burnishing tool 22 is mounted eccentrically on the arbor 23, and the arbor 23 is mounted eccentrically in the cylindrical body 24. A mounting screw 19 is provided for fixing the foot 5 to said cylindrical body. A pin 20 is mounted in a groove in the cylindrical body 24 for limiting the stroke and the position of the arbor 23. Set screws 21 are provided to fix said burnishing tool 22 to the arbor 23.

The device for diamond-burnishing of holes operates as follows.

The device for diamond-burnishing of holes, secured in a spindle of a miller or of a drilling machine is set up for a precise hole caliber to be machined by translating the arbor 23 inside an opening of the cylindrical body 24 to further fix the same with nuts 25. Later on, the device mounted in the machine-tool spindle is set in rotary motion, which results, under the effect of inertial forces, in the maximum possible distance displacement from the center of rotation, this distance being limited by a gap set between the diamond-burnishing tool 22 and the piece surface to be treated. The weights 9 entraining the bars 10 and the terminal arms 12 translate the guiding pins 14 via the crossheads 13, while the crossheads 13 simultaneously translated on the guiding pins 14 and compress the compression springs 17. At the same time, the extension springs 16 are stretched, and the force developed by the springs 16 and 17 enables the diamond-burnishing tool 22 to be smoothly fed to the hole surface to be treated and to return the working elements of the device to the starting position after stopping the machine tool spindle. The motion is transmitted via the extended shaft 18 to the cover 4 of the device and then, via the foot 5. The motion is transmitted to the cylindrical body 24 and finally to the arbor 23 with the diamond-burnishing tool 22. The needed pressing force is regulated through selection of the spindle rotation rate of the machine tool with the device for burnishing holes, and with the weight load, taking into consideration the resetting forces built up by the springs 16 and 17.

The pressing force can be calculated as follows:

$$F_{press.} = \omega^2 \cdot R \cdot M - 2(F_{extens.} + F_{compr.}),$$

where ω is the angular velocity of inertial weights 9, R is the distance between the center of the rotation axis and the center of the weight load, M is the total mass of inertial weights 9, $F_{extens.}$, $F_{compr.}$ are opposing forces of the extension and compression springs 16 and 17.

The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

The invention claimed is:

1. A device for diamond-burnishing of holes, comprising
a housing;
a stem extending from the housing;
a translation mechanism mounted on the stem and in the housing;
wherein the translation mechanism comprises:
a pair of central arms and two pairs of terminal arms fitted on an end of the stem,
crossheads linking the central and terminal arms to each other,
guide pins slideably receiving the crossheads,
a compression spring mounted between said crossheads, extension springs linking ends of said guide pins to each other,
bars linked to ends of said terminal arms via shafts, and inertial weights mounted on said bars,
a cover mounted in a groove in the housing, and linked to the translation mechanism via one of said shafts;
a foot mounted on the cover;
a cylindrical body mounted on the foot;
an arbor mounted in an opening in the cylindrical body; and
a diamond-burnishing tool fixed to said arbor.

2. The device according to claim 1, wherein said guide pins are located in grooves provided in the housing.

3. The device according to claim 1, further comprising a brass plate mounted in the groove at one side thereof, between the housing and the cover.

4. The device according to claim 1, wherein the foot is fixed on the cover by screws.

5. The device according to claim 1, further comprising a pin located in a groove made in the cylindrical body for limiting stroke and position of the arbor.

6. The device according to claim 1, wherein the arbor is mounted eccentrically in the cylindrical body.

7. The device according to claim 1, wherein the diamond burnishing tool is mounted eccentrically on the arbor.

8. The device according to claim 1, wherein the groove in the housing comprises a dovetail groove in the housing.

9. The device according to claim 1, wherein the stem is tapered.

* * * * *